(12) United States Patent
Doubleday et al.

(10) Patent No.: US 9,787,709 B2
(45) Date of Patent: Oct. 10, 2017

(54) DETECTING AND ANALYZING OPERATIONAL RISK IN A NETWORK ENVIRONMENT

(71) Applicant: Bank of America Corporation, Charlotte, NC (US)

(72) Inventors: Jeffrey De Wayne Doubleday, Green Cove Springs, FL (US); Alberto Ramos, Milltown, NJ (US); Darryl Alan Sansbury, Charlotte, NC (US); Michael Werner Eagen Spalding, Denver, NC (US); Steven Younger, Basking Ridge, NJ (US)

(73) Assignee: Bank of America Corporation, Charlotte, NC (US)

( * ) Notice: Subject to any disclaimer, the term of this patent is extended or adjusted under 35 U.S.C. 154(b) by 50 days.

(21) Appl. No.: 14/741,711

(22) Filed: Jun. 17, 2015

(65) Prior Publication Data
US 2016/0373478 A1   Dec. 22, 2016

(51) Int. Cl.
*H04L 29/06* (2006.01)
*G06F 9/445* (2006.01)
*G06F 21/57* (2013.01)
*H04W 12/08* (2009.01)
*H04L 12/26* (2006.01)

(52) U.S. Cl.
CPC ............ *H04L 63/1433* (2013.01); *G06F 8/65* (2013.01); *G06F 21/577* (2013.01); *H04L 63/20* (2013.01); *H04W 12/08* (2013.01); *H04L 43/0817* (2013.01)

(58) Field of Classification Search
CPC . H04L 63/1433; H04L 63/20; H04L 43/0817; G06F 8/65; G06F 21/577; H04W 12/08
See application file for complete search history.

(56) References Cited

U.S. PATENT DOCUMENTS

| | | | |
|---|---|---|---|
| 6,938,027 B1 * | 8/2005 | Barritz | G06Q 10/00 706/50 |
| 9,166,999 B1 * | 10/2015 | Kulkarni | H04L 63/1433 |
| 9,317,692 B2 * | 4/2016 | Elder | G06F 21/577 |
| 2006/0103966 A1 * | 5/2006 | Georgis | G11B 15/6835 360/69 |
| 2008/0263534 A1 * | 10/2008 | Hirsave | G06F 21/577 717/168 |
| 2011/0154498 A1 * | 6/2011 | Fissel | H04L 63/1433 726/25 |
| 2011/0252464 A1 * | 10/2011 | Sanjeev | H04L 63/107 726/7 |

(Continued)

*Primary Examiner* — Hadi Armouche
*Assistant Examiner* — Cheng-Feng Huang
(74) *Attorney, Agent, or Firm* — Michael A. Springs

(57) ABSTRACT

In one embodiment, a system for the realization of operational risk in a network includes an interface to receive a change request to update a network application, the network application utilizes a network device. The system may then use a processor communicatively coupled to the interface to generate a change risk score associated with the change request, wherein the change risk score includes a service tier risk score, a time risk score, a day risk score, a security risk score, and a mobile device risk score. The processor may determine whether the change risk score is within a high-risk level, and if so, implement a change counter measure.

17 Claims, 4 Drawing Sheets

(56) References Cited

U.S. PATENT DOCUMENTS

| | | | |
|---|---|---|---|
| 2013/0318614 A1* | 11/2013 | Archer | G06F 21/577 726/25 |
| 2014/0024348 A1* | 1/2014 | Hurst | H04M 3/5232 455/414.1 |
| 2014/0189873 A1* | 7/2014 | Elder | G06F 21/577 726/25 |
| 2014/0359777 A1* | 12/2014 | Lam | G06F 21/577 726/25 |
| 2015/0261769 A1* | 9/2015 | Ono | G06F 17/3087 707/724 |
| 2015/0269579 A1* | 9/2015 | Subramanian | G06Q 20/4016 705/44 |
| 2015/0269580 A1* | 9/2015 | Subramanian | G06Q 20/4016 705/44 |
| 2015/0278219 A1* | 10/2015 | Phipps | G06Q 10/0637 707/711 |
| 2015/0365437 A1* | 12/2015 | Bell, Jr. | H04L 63/20 726/1 |

\* cited by examiner

US 9,787,709 B2

DETECTING AND ANALYZING OPERATIONAL RISK IN A NETWORK ENVIRONMENT

TECHNICAL FIELD

The present invention relates generally to the field of networking and, more specifically, to detecting and analyzing operational risk in a network environment.

BACKGROUND

Each day, an enterprise must handle millions of online transactions requested and performed by users visiting the enterprise's website. Depending on the enterprise, a user may login to an account held with the enterprise and interact with the enterprise's website using a number of applications. A user may perform these tasks from both desktop devices and mobile devices. An enterprise spends significant resources maintaining and supporting the systems that support these transactions and applications.

SUMMARY

In accordance with the present disclosure, disadvantages and problems associated with detecting and analyzing operational risk in a network environment may be reduced or eliminated.

In one embodiment, a system for the realization of operational risk in a network includes an interface to receive a change request to update a network application, the network application utilizes a network device. The system may then use a processor communicatively coupled to the interface to generate a change risk score associated with the change request, wherein the change risk score includes a service tier risk score, a time risk score, a day risk score, a security risk score, and a mobile device risk score. The processor may determine whether the change risk score is within a high-risk level, and if so, implement a change counter measure.

In some embodiments, a method for realizing operational risk in a network includes receiving, at an interface, a change request to update a network application, wherein the network application utilizes a network device. The method may also include calculating, using a processor communicatively coupled to the interface, a change risk score associated with the change request, wherein the change risk score includes a service tier risk score, a time risk score, a day risk score, a security risk score, and a mobile device risk score. The method may also include determining, using the processor, whether the change risk score is within a high-risk level, and if so, implement a change counter measure.

Certain embodiments of the invention may provide one or more technical advantages. One advantage of the present disclosure provides a technical solution to the technical issues faced with implementing changes to a system network by simulating and monitoring updates to system components affected by network changes. Another advantage allows an enterprise to understand the effects a change will have on the operational capacity of network devices thereby preventing future failures in the network. One or more other technical advantages may be readily apparent to one skilled in the art from the figures, descriptions, and claims, included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
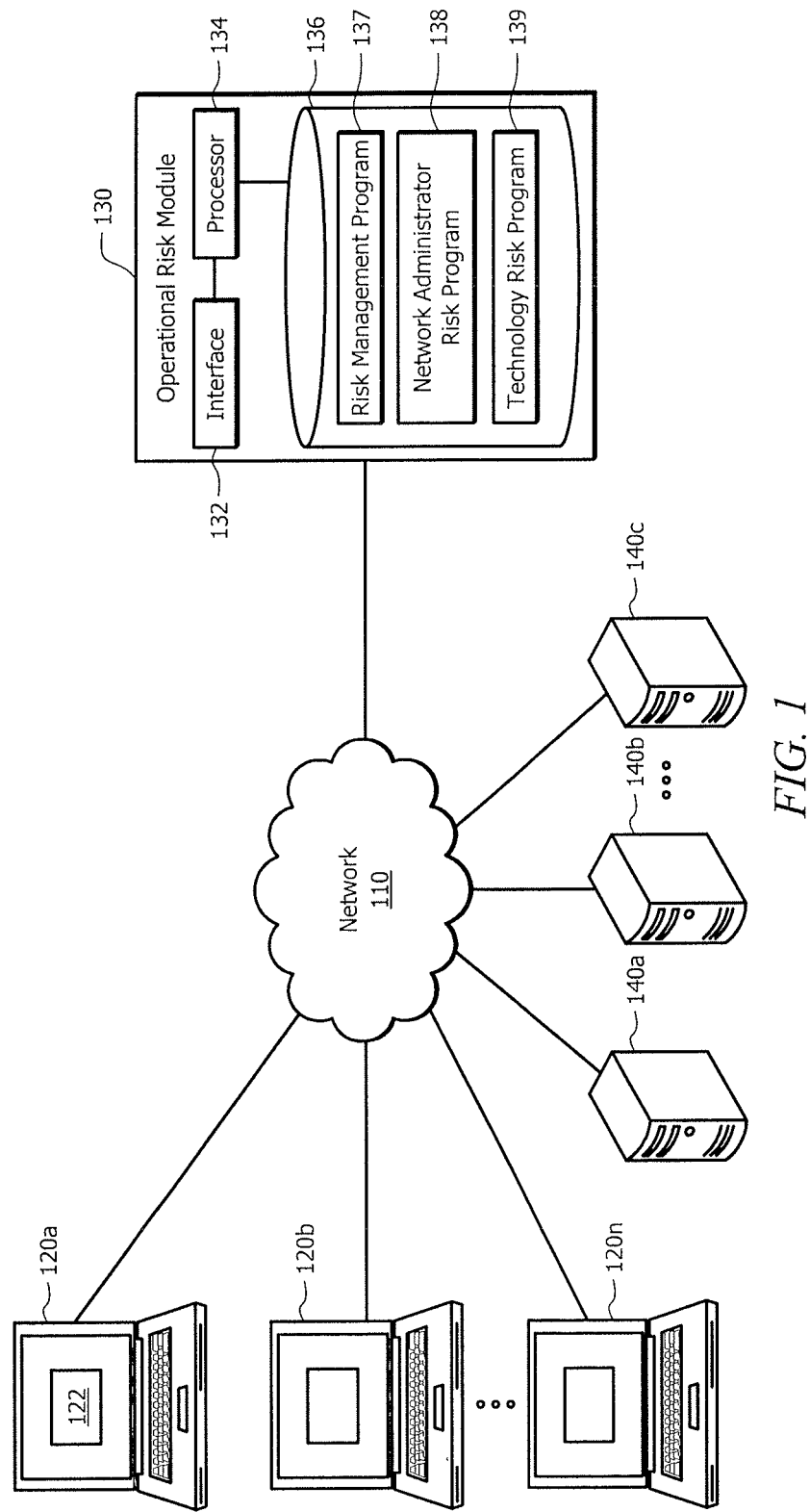
FIG. 1 is an example system for detecting and analyzing operational risk in a network environment.

Embodiments of the present disclosure and its advantages are best understood by referring to FIGS. 1-5, like numerals being used for like and corresponding parts of the various drawings.

Each day, an enterprise must handle millions of online transactions requested and performed by users visiting the enterprise's website. Depending on the enterprise, a user may login to an account held with the enterprise and interact with the enterprise's website using a number of applications. A user may perform these tasks from both desktop devices and mobile devices. An enterprise spends significant resources maintaining and supporting the systems that support these transactions and applications.

It is advantageous to provide a system and method that provide for the realization, analysis, and prevention of operational risk in a network environment. For example, an enterprise may provide a number of services to its customers and employees using a variety of applications. These applications may depend on the proper operation of one or more network devices such as web servers, application servers, databases, mainframes, routers, network switches, or any other suitable network device. When a change request is made for a network application, it is advantageous for the enterprise to determine how the change request will affect the network devices to identify potential risks associated with the implementation of the change request. By assessing the potential risks involved in updating a network application, the enterprise may preemptively avoid network outages and operational failures.

To detect, analyze, and prevent operational failures resulting from changes to network applications, the enterprise may generate a risk profile to assess the probability that a change will affect the quality and performance of network devices. In certain embodiments, a risk profile captures a plurality of data related to the change request such as the logistical risks, the technological risks, and the personnel risks involved in implementing the change.

In some embodiments, the logistical risk is determined using a process risk score that measures the risk related to potential failures associated with the execution, complexity, sequencing, or coordination of planned changes. A number of technical advantages may be recognized by properly evaluating a process risk score, such as the avoidance of network outages. Furthermore, the enterprise may assess the process risk score based on historical outcomes from analogous change requests. Historic outcomes may address the frequency, duration, and complexity of change requests and the subsequent effects the changes had on the network.

The technological risks involved in a change request may involve analyzing the capacity, life expectancy, and resiliency of network devices affected by the change request.

Taking quantitative measurements from real-time transactional data associated with the affected network devices may ensure that the volume of transactions handled by network devices is not approaching or exceeding the operational limits of the network device. The enterprise may also monitor the health (age) and compliance of network devices utilized in the enterprise's network. Relatedly, the enterprise may also analyze the failover capabilities available for a network application should a network device experience operational failure.

Understanding the personnel risks associated with a change request may allow the enterprise to assign a network administrator risk score to the change request based on the experience and skill sets of the network administrator responsible for maintaining the network devices utilized by a network application. This may allow the enterprise to evaluate how efficiently operational issues in the network can be remediated should an affected network device experience an operational failure. By generating this change risk profile for a change request, the enterprise may provide uninterrupted service to its clients.

FIG. 1 is an example system 100 for detecting and analyzing operational risk in a network environment. System 100 includes network 110 that facilitates communication between a workstations 120a-n, operational risk module 130, and network devices 140a-n. Elements of system 100 may occur within an enterprise. An enterprise may be an individual, business, company, or other organization. An example of an enterprise may include a clothing store, an online sales company, or a financial institution. An enterprise may include one or more lines of business, subsidiaries, or parent organizations.

Network 110 represents any suitable network operable to facilitate communication between the components of system 100. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof operable to facilitate communication between the components.

Workstations 120a-n (collectively "workstations 120") enable users to monitor, administer, or otherwise interact with operational risk module 130 and network devices 140. Workstations 120 may include one or more laptops, personal computers, monitors, display devices, handheld devices, smartphones, servers, user input devices, or other suitable components for enabling user input. One or more workstations 120 may include operational risk module 130 and network devices 140. Workstations 120 may be a part of an enterprise or may remotely access an enterprise. In the illustrated embodiment, workstations 120 include a graphical user interface (GUI) 122.

GUI 122 represents any suitable graphical arrangement of information presented to one or more users, network administrators, employees, and/or vendors. For example, GUI 122 may display information received from a website and/or operational risk module 130. GUI 122 is generally operable to tailor and filter data entered by and presented to a user. GUI 122 may provide a user with an efficient and user-friendly presentation of information. GUI 122 may comprise a plurality of displays having interactive fields, pull-down lists, and buttons operated by users. GUI 122 may include multiple levels of abstraction including groupings and boundaries. It should be understood that the term GUI 122 may be used in the singular or in the plural to describe one or more GUIs 122 in each of the displays of workstations 120.

In an example embodiment, an employee of an enterprise may access workstation 120a and submit a change request to update a network application used by the enterprise. For instance, the employee may be an application developer updating the login screen for the enterprise's website. In some embodiments, GUI 122 will present a number of questions and prompts for the application developer to answer before generating the change request. In this manner, the application developer may supply operational risk module 130 with important information such as the name of the application affected by the change request, the services provided by the application, and the date and time that the changes are to be implemented.

Figure 3:
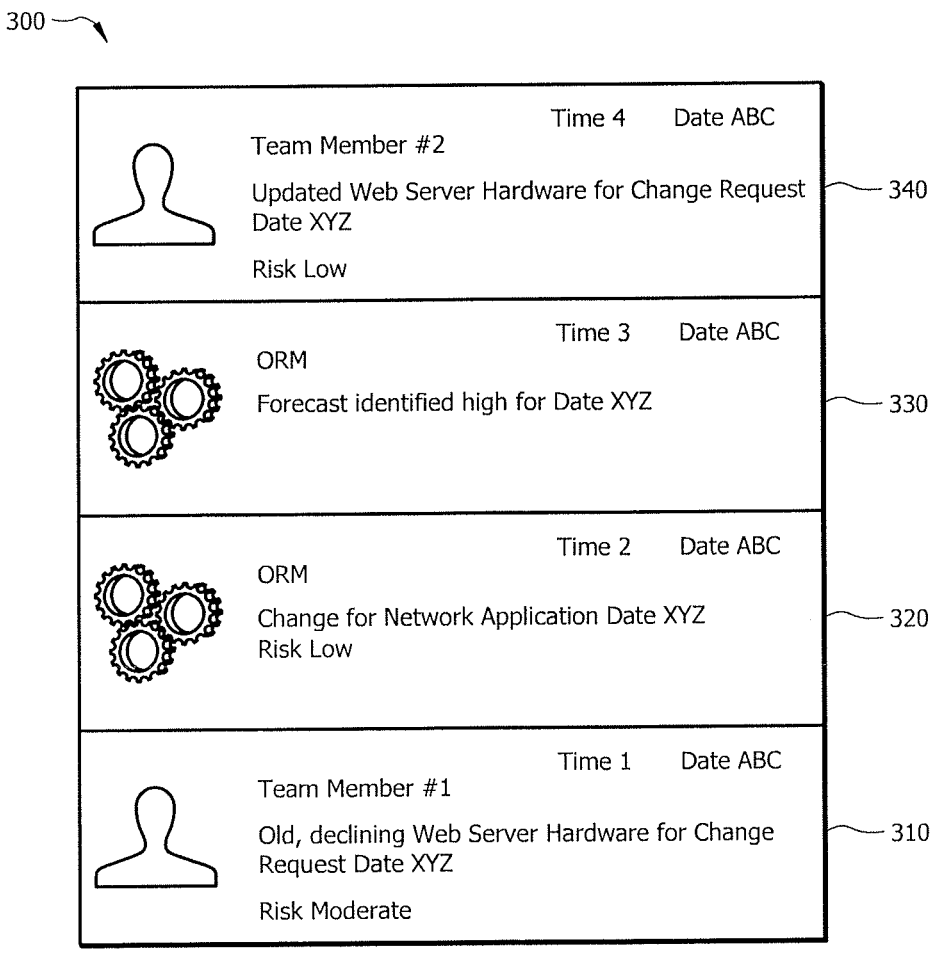
FIG. 3 is a diagram showing an example activity feed generated by operational risk module.

As described in FIG. 3, workstations 120 may also allow users and operational risk module 130 to send out communications regarding a change request and the associated change risk score generated by operational risk module 130 using an activity feed. This may allow users familiar with the network applications and network devices 140 affected by the change request to comment on the change risk score. For example, a network administrator may have knowledge regarding network devices 140 that may not be considered by operational risk module 130, such as unplanned maintenance or outages. The network administrator may use workstation 120a to communicate information regarding the unplanned outage to operational risk module 130, allowing operational risk module 130 to adjust the change risk score for the change request.

In some embodiments, workstations 120 may facilitate the communication of change counter measures from operational risk module 130. Operational risk module 130 may generate a change risk score for a change request. The change risk score may indicate that the change request has a high-risk level based on a number of logistical, technological, and personnel factors. In response, operational risk module 130 may notify a network administrator responsible for network devices 140 affected by the change request by using workstations 120. By alerting the network administrator of the change request, the network administrator may closely monitor the implementation of the change request and quickly respond to any issues that arise.

Operational risk module 130 represents any suitable components that facilitate predicting, detecting, analyzing, and preventing operational failures in system 100. Operational risk module 130 may include a network server, remote server, mainframe, host computer, workstation, web server, personal computer, file server, or any other suitable device operable to communicate with other devices and process data. In some embodiments, operational risk module 130 may execute any suitable operating system such as IBM's zSeries/Operating System (z/OS), MS-DOS, PC-DOS, MAC-OS, WINDOWS, UNIX, OpenVMS, Linux, or any other appropriate operating systems, including future operating systems.

The functions of operational risk module 130 may be performed by any suitable combination of one or more servers or other components at one or more locations. In the embodiment where the modules are servers, the servers may be public or private servers, and each server may be a virtual or physical server. The server may include one or more servers at the same or at remote locations. Operational risk module 130 may also include any suitable component that functions as a server. In some embodiments, workstations 120 and network devices 140 may be integrated with operational risk module 130 or they may operate as part of the same device or devices.

In the illustrated embodiment, operational risk module 130 includes an interface 132, a processor 134, and a memory 136, which comprises a risk management program 137, a network administrator risk program 138, and technology risk program 139.

Interface 132 represents any suitable device operable to receive information from network 110, transmit information through network 110, perform suitable processing of the information, communicate to other devices, or any combination thereof. For example, interface 132 may receive change requests from workstations 120, establish an activity feed to communicate information to network administrators and other users associated with the change request, display a risk dashboard to illustrate the various risk assessments created by operational risk module 130, and access network devices 140 to determine and/or measure operational performance data. Interface 132 represents any port or connection, real or virtual, including any suitable hardware and/or software, including protocol conversion and data processing capabilities, to communicate through a LAN, WAN, or other communication system that allows operational risk module 130 to exchange information with network 110, workstations 120, network devices 140, or any other components of system 100.

Processor 134 communicatively couples interface 132 and memory 136 and controls the operation of operational risk module 130. Processor 134 includes any hardware and software that operates to control and process information. Processor 134 may execute computer-executable program instructions stored in memory 136. Processor 134 may include, but is not limited to, a microprocessor, an application specific integrated circuit (ASIC), and or state machines.

Memory 136 stores, either permanently or temporarily, data, operational software, other information for processor 134, other components of operational risk module 130, or other components of system 100. Memory 136 includes any one or a combination of volatile or non-volatile local or remote devices suitable for storing information. For example, memory 136 may include RAM, ROM, flash memory, magnetic storage devices, optical storage devices, network storage devices, cloud storage devices, solid state devices, or any other suitable information storage device or a combination of these devices.

Memory 136 may store information in one or more databases, file systems, tree structures, any other suitable storage system, or any combination thereof. Furthermore, different information stored in memory 136 may use any of these storage systems. Moreover, any information stored in memory 136 may be encrypted or unencrypted, compressed or uncompressed, and static or editable. Although illustrated as including particular modules, memory 136 may include any suitable information for use in the operation of operational risk module 130.

In the illustrated embodiment, memory 136 includes a risk management program 137, a network administrator risk program 138, and technology risk program 139.

Network devices 140a-n (collectively "network devices 140"), represent any suitable number of devices to facilitate the communication of data and provide services for an enterprise. Network devices 140 may include, but are not limited to one or more web servers, application servers, databases, mainframes, routers, network switches, or any other suitable network device.

Processor 134 may implement risk management program 137 to detect, analyze, and prevent operational failures in network devices 140. For example, workstation 120a may communicate a change request to update a network application provided by an enterprise. The network application may utilize one or more network devices 140. Once operational risk module 130 receives the change request, risk management program 137 may calculate a change risk score associated with the change request to determine the risk level presented by the change request. Risk management program 137 may analyze a number of factors to calculate the change risk score, including but not limited to, a service tier risk score, a time risk score, a day risk score, a security risk score, a mobile device risk score.

The service tier risk score may be calculated based on the services affected by the change request. For example, the enterprise may provide a number of services to its customers and employees. In some embodiments, the enterprise may categorize or rank each of these services by how critical they are to the enterprise. For example, some services may be "external" services that are used and seen by the customer and thereby receive a higher risk category. Other services may be "internal" facing and only accessible by enterprise employees. These services may receive a lower risk category. If an enterprise determines that an external service is critical (e.g., a website login application) then the service tier risk score for that service may be deemed high-risk. If an enterprise determines that a service is less important but still an external service, the enterprise may categorize the service tier risk score as medium-risk. An enterprise may categorize services in any appropriate manner and tailor the risk categories to the services provided by the enterprise.

The time risk score and the day risk score may be calculated based on a time of day and day of the week the change request is to be implemented. In some embodiments, to determine when network applications and networks devices 140 are utilized, operational risk module 130 may determine the transaction volume associated with the network device and/or network application affected by the change request. Operational risk module 130 may store the transaction volume associated with each network application and network device 140 in memory 136. In certain embodiments, operational risk module 130 may communicate a request for the transaction volume information to a network administrator responsible for the application and/or network device 140. In this manner, operational risk module 130 may determine when and during what days network devices 140 and network applications process the most transactions.

The transaction volume information may then be compared to the time and date that the change request is to be implemented. If the change request is to be implemented during a heavy transaction period, the time risk score and the day risk score may calculate a high-risk level. If the change request is implemented during slow or moderate transaction period, the risk score may be low or moderate, respectively.

In some embodiments, the enterprise may designate certain times and days as low risk based on the type of transactions that the enterprise handles. For instance, and online retailer may experience minimal customer traffic on its website from 1:00 am to 6:00 am and heavy traffic from 6:00 pm to 10:00 pm. The enterprise may designate the early morning times as low risk and the evening times as high risk.

In certain embodiments, operational risk module 130 may cross reference the timing of change requests to determine if multiple changes will be made to network devices 140 or applications at the same time. For instance, network devices 140 may be utilized by multiple applications. Operational risk module 130 may receive change requests for multiple applications that utilize the same network devices 140. Operational risk module 130 may determine whether the change requests will overlap or take place at different times. Accordingly, if the change requests are implemented during overlapping periods, risk management program 137 may return a higher risk level for the time risk score and the day risk score.

The security risk score may be calculated based on whether the network application is associated with confidential information. Depending on the enterprise, confidential information may include social security numbers, credit or debit card numbers, account numbers, employer identification numbers, tax identification number, passwords or any other data an enterprise may deem confidential. In certain embodiments, confidential information may also include the processing or reporting of money, securities, trades, or other financial transactions. If the change request affects the way confidential information is handled, the change risk score may be increased to reflect the sensitive nature of the data involved. For example, an application updated by a change request may handle the processing of a credit card during an online transaction. Because of the sensitive nature of the credit card information, the change request may receive a higher risk score.

In some embodiments, the change request may affect the way data is stored and retrieved from one or more network devices 140. For instance, an enterprise may be upgrading a database that stores the credit card data of its customers. In response, risk management program 137 may increase the change risk score to reflect the importance of the information in the database.

The mobile device risk score may be calculated based on whether the network application is utilized by a mobile user device. Allowing mobile user devices to interact with an external service increases the complexity of the network application as it must be able to interface with multiple operating systems and platforms. For example, an enterprise may be a financial institution that allows its customers to check their account balances from their phones or tablets. If a change request indicates that an update is being made to the application that provides users their account balance, risk management program 137 may increase the change risk score for the change request.

In some embodiments, operational risk module 130 may provide additional factors to address the risks associated with a change request by identifying the personnel and technology associated with the change request. These additional factors may allow operational risk module 130 to provide a more detailed analysis of the risk levels associated with a change request.

For example, processor 134 may implement network administrator risk program 138 to identify the skillsets and experience levels of one or more network administrators associated with network devices 140 that are affected by the change request. Network administrator risk program 138 may associate each network device 140 with a corresponding network application utilized by each network device 140. Furthermore, each network device 140 may also be associated with one or more network administrators that are responsible for the upkeep and maintenance of network device 140. When operational risk module 130 receives a change request indicating a change to be made to a network application, network administrator risk program 138 may determine network devices 140 utilized by the network application and the network administrator responsible for those devices.

In some embodiments, network administrator risk program 138 stores a plurality of data regarding the network administrator responsible for network devices 140. For instance, network administrator risk program 138 may calculate a network administrator risk score for each network administrator. Network administrator risk score may include a number of factors including, but not limited to, an experience risk score and a skillset risk score.

An experience risk score may be determined based on the experience level of the network administrator. In some embodiments, a network administrator represents a network team, and an experience risk score is determined for each member of the network team. In some embodiments, an experience risk score is determined for the entire team as a whole. Experience may be determined in any appropriate manner. For example, experience may be determined based on how many years each member of the network team has been working for the enterprise or how many years the network team has collectively been working for the enterprise. As an illustration, network administrators having 0-3 years of experience may receive a higher risk level, network administrators having 3-7 years of experience may receive a medium risk level, and network administrators having 7+ years of experience may receive a low risk level.

A skillset risk score may be determined based on the skillsets held by the network administrator. In embodiments where a network administrator represents a network team, the skillset may be calculated for each individual team member, or it may be calculated for the skillsets held by the entire team. Network administrator risk program 138 may store the certifications, education, and training completed by members of a network team. The enterprise may associate certain qualifications with certain risk levels. In some embodiments, an enterprise may offer certifications that indicate mastery of certain skillsets. In some embodiments, an enterprise may rely on recognized industry certifications (e.g., Windows Server Certifications, Cisco Career Certifications). The enterprise may then associate each skillset level with a different risk level.

Once a network administrator risk score is calculated, operational risk module 130 may adjust the change risk score based on the network administrator risk score. For example, if a network administrator has significant experience and skillsets, the network administrator risk score may be calculated to be a low-risk level. The network administrator risk score may then adjust the change risk score downward to reflect the ability of the network administrator risk score to address any operational issues that may arise when the change is implemented. If the network administrator risk score has a high-risk level, indicating a lower experience level of the network administrator and fewer skillsets, the network administrator risk score may adjust the change risk score upward, to a higher risk level. As explained below, the change risk score may be calculated and/or adjusted in any appropriate manner.

Processor 134 may also implement technology risk program 139 to assess the risks associated with network devices 140 that are affected by the change request. Operational risk module 130 may also actively monitor network devices 140 to maintain real-time metrics related to the volume of transactions handled by network devices 140, the rate of transaction arrival, or any other performance metric that an enterprise may associate with network device 140. In some embodiments, operational risk module 130 may store these metrics in memory 136 and associate each metric with its respective network device 140.

Technology risk program 139 may calculate a technology risk score for one or more of network devices 140 affected by a change request. Technology risk score may include a number of factors including, but not limited to, a capacity risk factor, an asset lifecycle factor, and a resiliency risk factor.

A capacity risk factor may be determined by measuring a volume of real-time data flow through the network device compared to an operational limit for the network device. An operational limit for network device 140 may be provided to operational risk module 130 by a network administrator using workstation 120a. In some embodiments, the operational limit is provided when network device 140 is added to the enterprise's network. Depending on the type of network device 140, operational risk module 130 may periodically measure the volume of real-time data handled by network device 140 and compare the transactional volume to the operational limit.

For example, a web server may handle a number of transactions per second during peak hours, as users interface with the enterprise through the enterprise's website. Depending on the specific network device 140, technology risk program 139 may have ranges for identifying the risks associated with the number of transactions per second handled by network device 140. As the transaction volume approaches an operational limit for network device 140, the capacity risk factor may increase the risk level.

As an illustration, a capacity risk factor may be calculated for a web server. The capacity risk factor may assign a high-risk level if the transaction volume exceeds 50 transactions per second, a medium-risk level when the transaction volume is between 20 and 50 transactions per second, and a low-risk level if the web server handles less than 20 transactions per second. Although described as a web server, a capacity risk factor may be tailored for any suitable network device, such as a storage capacity of a database.

In some embodiments, a capacity risk factor may consider a number of other metrics associated with network devices such as the expected peak number of concurrent users, the number of upstream applications depending on network devices 140, and the importance of the network applications utilizing network device 140, or whether network device 140 is handling encrypted versus unencrypted data. An enterprise may assign any appropriate risk level to the capacity risk factor.

An asset lifecycle factor may be determined by comparing a current operating age of network device 140a to an expected lifetime of network device 140a. In some embodiments, an expected lifetime for network device 140 may be provided to operational risk module 130 by a network administrator using workstation 120a. Technology risk program 139 may keep track of the age of each network device 140 and update the associated asset lifecycle factor as each network device 140 ages closer to its expected lifetime.

For example, if network device 140a has an expected lifetime of 10 years, technology risk program 139 may assign a low-risk level to network device 140 for the first three years of operation, a medium-risk level when network device is 4-7 years old, and a high-risk level when the network device is more than 7 years old.

Asset lifecycle factor may also consider the age of the software being utilized by network devices 140, the platform network devices 140 use, and the age of the hardware components comprising network devices 140. In this manner, operational risk module 130 may track and monitor the age of network devices 140 utilized by an enterprise. In some embodiments, this may allow the enterprise to forecast when network devices 140 need to be upgraded. For example, operational risk module 130 may send out an alert to a network administrator responsible for network device 140a when network device 140a is assigned a high risk level for its asset lifecycle factor. The enterprise may utilize the asset lifecycle factors to route traffic through the enterprise's network to minimize the risks associated with an older network device 140 failing.

A resiliency risk factor may be determined based on a failover capability of the network device during an operational failure. Technology risk program 139 may determine whether additional network devices 140 are available to handle the operations of network device 140 affected by a change request should network device 140 fail. For example, if a change request will affect one of several web servers handling transactions from an enterprise's website, and the other web servers can handle an increase in transactions should the affected web server go offline, technology risk program 139 may assign a low-risk level to the affected web server. In contrast, a change request may affect a database storing confidential data. The enterprise may not have any other database setup to handle the confidential data. Technology risk program 139 may assign a high-risk level to the database indicating the limited failover options.

In some embodiments, resiliency risk factor may also consider the complexity of the network in which network device 140 operates. If the network has a large number of interconnected components and devices indicating a higher complexity, resiliency risk factor may determine a higher risk level for network device 140.

Once a technology risk score is calculated, operational risk module 130 may adjust the change risk score based on the technology risk score. For example, if network device 140 associated with change request is operating at 95% capacity, is five-years old, and has minimal fail over capability, the technology risk score may be calculated as a high-risk level for network device 140. This may lead to operational risk module 130 raising the change risk score to reflect the technological issues that present an increased risk to the change request.

Although network administrator risk program 138 and technology risk program 139 have been described as adjusting the change risk score, in some embodiments, network administrator risk program 138 and technology risk program 139 are integrated into the risk score calculation using one or more of the factors considered by network administrator risk program 138 and technology risk program 139.

Once the change risk factors are calculated and/or adjusted, operational risk module 130 may then calculate the overall change risk score. In some embodiments, calculating a change risk score may be accomplished in any manner that allows an enterprise to evaluate the risk associated with a change request. For example, change risk score may be a weighted average of the factors considered by operational risk module 130. In some embodiments, each factor may be scored in a range from 1-100 with 1 being low risk and 100 being high risk. Each factor may then be weighted based on the importance of the factor to the overall change risk score. As an example, and not by way of limitation, a service tier risk score and a security risk score may each make up 30% of the change risk score, while the remaining factors considered by the change risk score make up the remaining 40%.

Although described as a weighted average, any suitable method may be used to calculate the change risk score. For example, an enterprise may add and subtract the contributions from each risk factor to determine a final value. The enterprise may then assign risk levels to the various ranges that the final value may fall in.

Figure 2:
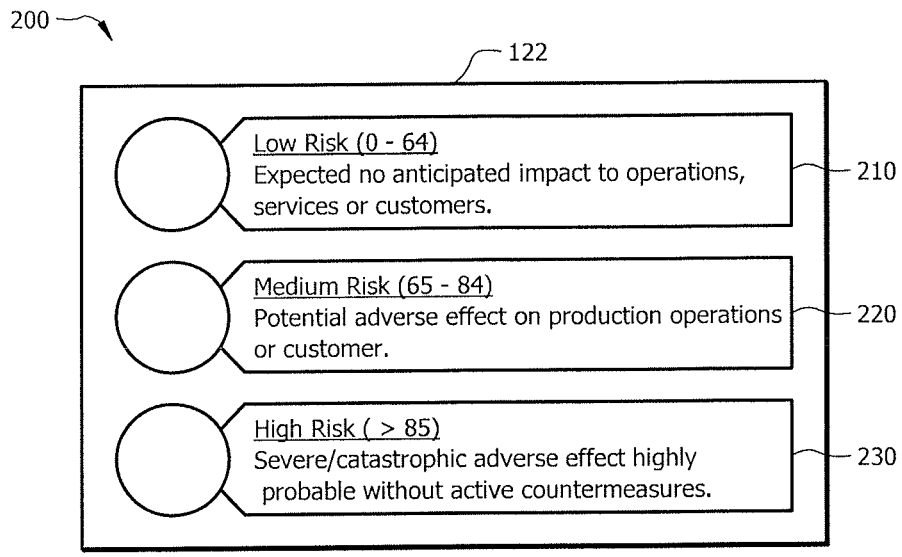
FIG. 2 is a diagram showing an example breakdown of risk levels an enterprise may create for a change risk score.

As discussed in FIG. 2, in some embodiments, once operational risk module 130 calculates a resulting change risk score, the enterprise may categorize the change risk score based on its value (e.g., high-risk level, medium-risk level, low-risk level).

Once operational risk module 130 has categorized the change risk score, the enterprise may determine whether subsequent action is needed to avoid a potential operational failure in network devices 140 and/or the network application. In some embodiments, the enterprise may decide to implement a change counter measure in response to determining that the change risk score exceeds a certain value or is within a certain range (e.g., a high-risk level).

Any appropriate change counter measure may be implemented by operational risk module 130. For instance, operational risk module 130 may determine that one or more network devices 140 need to be upgraded in response to a change to a network application.

As another example of a change counter measure, operational risk module 130 may assign additional network administrators/employees to monitor the implementation of the change request. This may allow any issues that arise to be quickly resolved. For example, operational risk module 130 may identify one or more network administrator members responsible for network devices 140 affected by the change request. Operational risk module 130 may then communicate a notification to workstations 120 used by the network administrators alerting them of the change request and the potential risks involved. In some embodiments, this notification may be sent out using an activity feed that the network administrators may be subscribed to.

In certain embodiments, the enterprise may adjust risk factors due to periodic heightened intolerance for known risks. A heightened intolerance for risk may manifest from exogenous factors, such as world events, volatility or natural disasters; cyclical events, such as accounting, statement production, or holiday shopping transactions and their related intensive data processing; or transient events, such as marketing campaigns or other reputational events.

In some embodiments, operational risk module 130 may determine that the implementation time and/or date of the change request creates too high of a risk. In response, operational risk module 130 may communicate a revised change request to the user associated with the original change request. The revised change request may identify one or more alternative time periods and/or days to implement the change request. In some embodiments, this may be necessitated by a prior scheduled change request that affects the same network devices 140 or network applications.

In this manner, operational risk module 130 may identify the risks associated with a change request, monitor the network devices 140 utilized by the change requests, and ameliorate any changes that may present an elevated or high risk to the enterprise.

A component of system 100 may include an interface, logic, memory, and other suitable elements. An interface receives input, sends output processes the input and/or output, and performs other suitable operations. An interface may comprise hardware and software. Logic performs the operation of the component. For example, logic executes instructions to generate output from input. Logic may include hardware, software and other logic. Logic may be encoded in one or more non-transitory, tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and other logic.

Modifications, additions, or omissions may be made to system 100 without departing from the scope of the invention. For example, an enterprise may be a financial institution that must comply with Sarbanes/Oxley and other regulations. If a change request affects a network application responsible for financial reporting or other compliance requirements, the enterprise may adjust the change risk score to reflect a higher risk. In some embodiments, network device 140a may have a control plan that describes how network device 140a is maintained and how operational issues are handled. In response to determining that network device 140a has a control plan, operational risk module 130 may lower the risk level of the change risk score.

Operational risk module 130 may also generate a report detailing all the change requests and associated change risk scores for a specified time and/or date. For example, workstation 120a may communicate with operational risk module 130 to determine when would be the best time to make changes to network devices 140 based on the current change requests and change risk scores. Any suitable logic may perform the functions of system 100 and the components within system 100.

FIG. 2 is a diagram 200 showing an example break down of risk levels an enterprise may create for a change risk score. Diagram 200 is broken down into three risk levels, low-risk level 210, medium-risk level 220, and high-risk level 230. Although illustrated as three different levels, an enterprise may evaluate a change risk score in any appropriate manner with varying levels of granularity and severity. In some embodiments, diagram 200 may be presented to a user using workstations 120 through GUIs 122.

In the illustrated embodiment, if a change risk score is calculated to be between 0 and 64, the change risk score may be categorized as low-risk level 210. A low-risk level 210 may indicate that the enterprise expects no anticipated impact to operations, services, or customers.

If a change risk score is calculated to be between 65 and 84, the change risk score may be categorized as medium-risk level 220. Medium risk level 220 may indicate that there is an increased probability of a potential adverse effect on production operations or a customer. This may lead to interruptions in services or outages of network devices 140.

If a change risk score is calculated to be greater than 85, the change risk score may be categorized as high-risk level 230. High-risk level 230 may indicate that a severe or catastrophic adverse effect is highly probable without one or more change counter measures. In response to change risk score being categorized as a high-risk level 230, operational risk module 130 may take steps to alert the originator of the change request. Furthermore, depending on the factors leading to the high change risk score, operational risk module 130 may implement one or more change counter measures.

For instance, the change request may affect a network application handling confidential information and network devices 140 utilized by the network application may have limited failover capabilities. Furthermore, the network administrator responsible for network device 140 may have limited experience indicating a higher risk level. This may lead to a high-risk level for the change request. In response, operational risk module 130 may assign additional network administrators to monitor network device 140 when the change request is implemented.

Modifications, additions, or omissions may be made to diagram 200 without departing from the scope of the invention. For example, diagram 200 may breakdown each of the factors considered by the change risk factor and show their individual scores. This may allow a user to see what factors are affecting the change risk score. For example, a user may submit a change request to update a network application for a rarely used, internally facing, network application. The user may implement the change during a slow period for the enterprise. However, although the user may expect a low-risk level, the change risk score may indicate a medium-risk score based on a high-risk level for the technology risk score. This may allow the user to identify the network administrators and/or network devices 140 handling the network application and see if network device 140 should be upgraded or replaced based on the capacity, asset lifecycle and resiliency risk factors.

FIG. 3 is a diagram showing an example activity feed 300 generated by operational risk module 130. Activity feed 300 may be generated by operational risk module 130 in response to receiving a change request from workstations 120. Activity feed 300 may be subscribed to by any number of application developers, managers, and network administrator members. Activity feed 300 may take a number of forms such as an RSS feed, a community board, or a comment section on an enterprise's website or intranet. In some embodiments, the messages may be automatically generated by operational risk module 130 or may be created by the subscribers to activity feed 300. In certain embodiments, comments and messages sent over activity feed 300 may be used to adjust the change risk score based on the knowledge and experience held by the subscribers.

In the illustrated embodiment, activity feed 300 comprises a number of messages sent out for an example change request. A message may include the sender of the message (a network administrator, the originator of the change request, an automated message from operational risk module (ORM) 130). The message may be time stamped with the date and time the message was sent.

For example, first message 310 may be generated by Team Member #1. Team Member #1 may be part of a network team responsible for a web server affected by a change request to be implemented on the Date XYZ. Team Member #1 may send a message indicating that the web server affected by the change request is old and is declining and that the risk-level for the change request should be moderate.

Second message 320 may be generated by operational risk module 130 as indicated by "ORM." Second message 320 may be a notification alerting subscribers that a change request for a network application is to be implemented on Date XYZ and that the risk level is low.

Third message 330 may also be generated by ORM. Third message 330 may be a notification that there are multiple change requests being implemented on Date XYZ. By sending out a notification regarding the multiple change requests that are already being implemented for a certain date, users submitting change requests may select alternative dates to implement their respective change requests.

Fourth message 340 may be generated by Team Member #2. Team Member #2 may also be part of a network team responsible for the web server affected by a change request to be implemented on Date XYZ. Team Member #2 may indicate that the web server has been updated and that the resulting risk level should be lowered.

In some embodiments, operational risk module 130 may recognize that Team Member #2 is a manager of the network team. In response to the recommendation that the change risk score for the change request be lowered, operational risk module 130 may lower the change risk score.

In this manner, operational risk module 130 may communicate activity feed 300 to a plurality of users associated with a change request. Activity feed 300 may include the change request and the change risk score. Users associated with the change request may communicate over activity feed 300 and notify others about updates and other potential events that may negatively and/or positively affect the change request. In some embodiments, operational risk module 130 may adjust the change risk score based on the updates and comments provided by members in activity feed 300.

Modifications, additions, or omissions may be made to activity feed 300 without departing from the scope of the disclosure. For example, operational risk module 130 may consider a number of factors when deciding to reduce or increase a risk score such as the experience of the commenting team member and whether there is a consensus regarding whether the risk level should be raised or lowered. Accordingly, the activity feed may only provide relevant information to subscribers. Any suitable logic may perform the functions of project dashboard.

Figure 4:
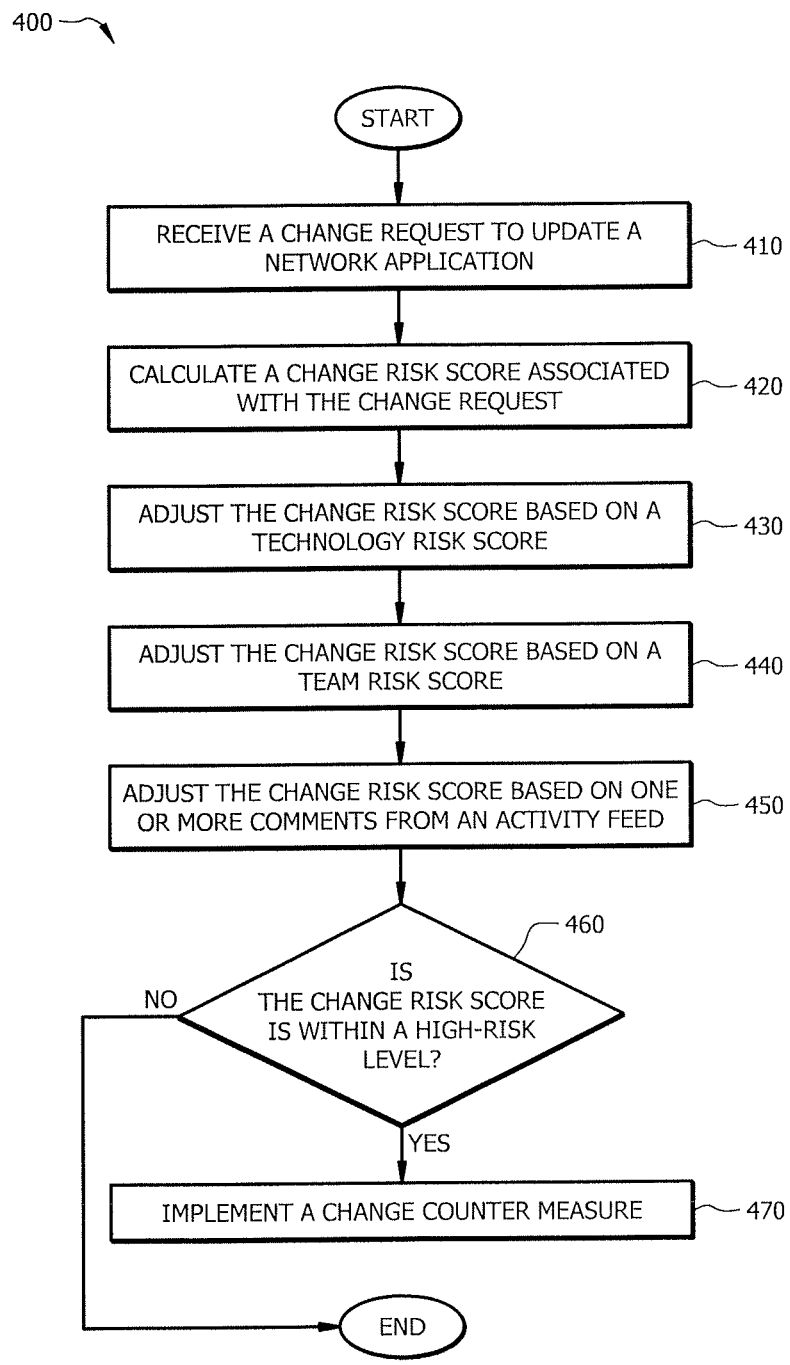
FIG. 4 is a flowchart showing an example method for detecting and analyzing operational risk in a network environment.

FIG. 4 is a flowchart showing an example method 400 for detecting and analyzing operational risk in a network environment. At step 410, operational risk module 130 receives a change request to update a network application. In some embodiments, a user may access workstation 120a and submit a change request to update a network application used by the enterprise. To facilitate submitting a change request GUI 122 may present a template for the user to complete. The template may ask for certain details such as the network application being update, the type of update, and when the update is planned to be implemented.

In some embodiments, operational risk module 130 may associate a plurality of additional information with each change request and network application to facilitate the creation of a change risk score. The additional information may include one or more network devices 140 utilized by the network application and one or more network administrators responsible for network devices 140.

Once operational risk module 130 receives the change request, at step 420, operational risk module 130 may calculate a change risk score associated with the change request to determine the risk level presented by the change request. In some embodiments, operational risk module 130 may utilize risk management program 137 to calculate a change risk score associated with the change request. Risk management program 137 may analyze a number of factors to calculate the change risk score, including but not limited to, a service tier risk score, a time risk score, a day risk score, a security risk score, a mobile device risk score.

At step 430, operational risk module 130 may adjust the change risk score based on a technology risk score. In some embodiments, technology risk program 139 may calculate a technology risk score for one or more of network devices 140 affected by a change request. Technology risk score may include a number of factors including, but not limited to, a capacity risk factor, an asset lifecycle factor, and a resiliency risk factor. In this manner, operational risk module 130 may make one or more quantitative measurements using real-time transactional data to determine the capacity and resiliency of network devices 140.

At step 440, operational risk module 130 may adjust the change risk based on a network administrator risk score. When operational risk module 130 receives a change request indicating a change to be made to a network application, network administrator risk program 138 may determine network devices 140 utilized by the network application and the network administrator responsible for those devices. Operational risk module may utilize network administrator risk program 138 to identify the skillsets and experience levels of one or more network administrators associated with network devices 140 affected by the change request.

In some embodiments, network administrator risk program 138 stores a plurality of data regarding the network administrator responsible for network devices 140. For instance, network administrator risk program 138 may calculate a network administrator risk score for each network administrator. Network administrator risk score may include a number of factors including, but not limited to, an experience risk score and a skillset risk score. The change risk score may then be adjusted according to the abilities of the network administrator associated with the affected network devices 140.

At step 450, operational risk module 130 may adjust the change risk based on one or more comments from activity feed 300. By receiving feedback from network team members and other users with knowledge of the change requests being implemented, operational risk module may fine-tune the change risk score.

For example, operational risk module 130 may rank each of the network administrator members by seniority and adjust the change risk score based on how the various team members respond to the current change risk score. Thus, less experienced team members may not have the influence over the change risk score that a senior team member may have.

At step 460, operational risk module 130 may determine whether the resulting change risk score is within a high-risk level. After receiving feedback and making adjustments to the change risk score based on the technology risk score, the network administrator risk score, and any social commentary, change risk score may represent a robust assessment of the risks involved in implementing a change request. An enterprise may develop a number of risk levels to identify what the enterprise considers to be high risk, moderate risk, and low risk changes. In response to determining that a higher risk exists for implementing certain changes, the enterprise may then take steps to mitigate the potential harms caused by the change. If the change risk score is within a high-risk level then the sequence may proceed to step 470. If not, then the sequence may end.

At step 470, operational risk module 130 may implement a change counter measure. In some embodiments, operational risk module 130 may determine the appropriate counter measure based on the factors contributing to the high-risk level. For instance, if technology risk factor indicates a high-risk level based on the use of an older network device 140 operating at capacity, operational risk module 130 may notify the network administrator that network device 140 should be updated or replaced.

Various embodiments may perform some, all, or none of the steps described above. In some embodiments, operational risk module 130 may organize and prioritize the urgency of the risk factors by assessing the immediacy of the risks presented. For instance, network device 140 may be running at 85% capacity and may be six years old with a life expectancy of ten years. Operational risk module 130 may identify that network device 140 may need to be replaced or updated in the next year to avoid an operational failure.

While discussed as operational risk module 130 performing these steps, any suitable component of system 100 may perform one or more steps of the method. Furthermore, one or more of these steps may be repeated or omitted from the method without deviating from the scope of the disclosure.

Figure 5:
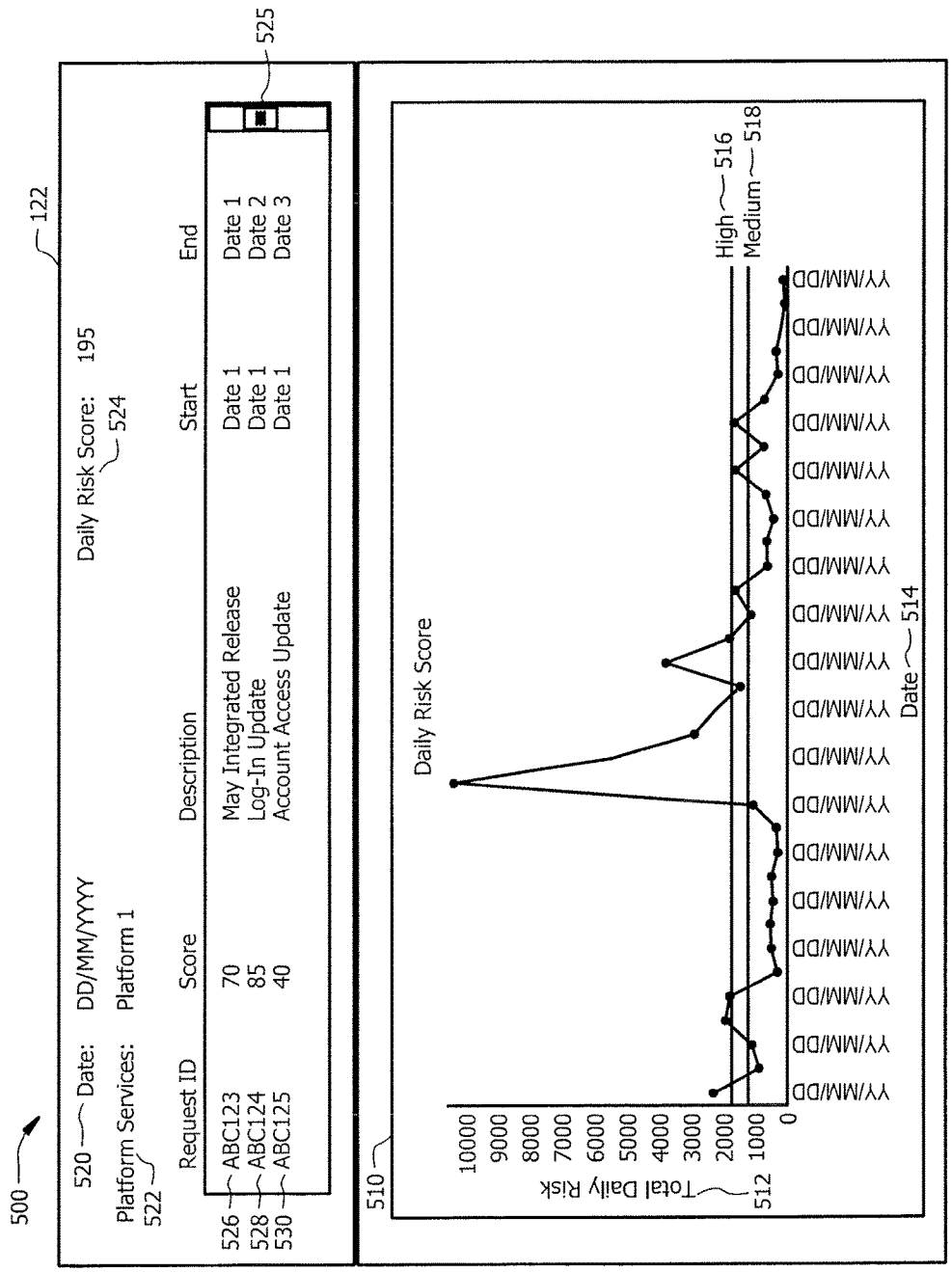
FIG. 5 is a screenshot showing an example portal of change risk scores.

FIG. 5 is a screenshot showing an example portal 500 of change risk scores generated by operational risk module 130. GUI 122 may allow a user to view portal 500 and interact with the filters and data provided by portal 500. Portal 500 may include diagram 510 for illustrating the daily risk score for a selected period of time (e.g., a week, a month, a year), and a number of filters for identifying risk scores for various services, dates, or change requests.

In the illustrated embodiment, diagram 510 displays a line chart showing the daily risk scores based on the change requests being implemented by an enterprise. Diagram 510 may include y-axis 512 displaying the total risk score on any suitable scale. For example, the enterprise may add the calculated risk scores for each change request being implemented for a specific day to arrive at a total daily risk score. Diagram 510 may also include x-axis 514 displaying the time period requested by the user. For instance, the time period may look at the total change risk score for each day of a specified month. Diagram 510 may also include cutoff lines indicating high risk-level cutoff 516 and medium risk-level cutoff 518. This may allow a user to quickly identify which days had a cumulative change request resulting in a high or medium risk score.

In some embodiments, a user may check the daily risk score for a future date. Diagram 510 may display the currently planned daily risk score for a future date, allowing a user to determine when would be the best date to implement a change request. For example, the user may determine that because the future daily risk score is already between high risk-level cutoff 516 and medium risk-level cutoff 518 that a different date should be used to implement a change request.

Portal 500 may also display additional data and provide a number of filters to aid the user assessing the risks associated with change requests. In the illustrated embodiment, portal 500 includes date search bar 520, platform services search bar 522, daily risk score 524 and change request list 525.

Using date search bar 520 a user may pull up each change request scheduled for a requested date. The user may also filter the change requests for specific applications, programs, network devices 140, server locations, and network administrators. For example, a user may input "DD/MM/YYYY" into date search bar 520 and "Platform 1" into platform services search bar 522 to view daily risk score 524 and change requests for the specified day and platform. Change request list 525 may then display each of the change requests related to Platform 1 being implemented on DD/MM/YYYY.

For example, in the illustrated embodiment, change request list 525 includes first change request 526, second change request 528, and third change request 530. Change request list 525 may provide any suitable number of data points related to each change request. Change request list 525 may include a change request ID, the calculated change risk score, a description of the change request, when the change request is to be implemented, and when the change request should be completed. Accordingly, first change request 526 may have a change request ID of "ABC 123," a calculated risk score of 70, a description of "May Integrated Release," a start date of "Date 1," and an end date of "Date 1." Daily risk score 524 may combine each of the scores for the listed change requests and display the daily risk score (e.g., 195).

Although portal 500 is illustrated displaying a total risk score for a given time period, portal 500 may also display tailored data for resiliency risk factors, asset risk factors, technology risk factors, or any other suitable risk factor data.

For example, portal 500 may display information related to calculated asset lifecycle factors. Using platform services search bar 522, a user may search for specific network devices 140 to view the asset lifecycle factors associated with network devices 140. Similarly, a user may view each network device 140 utilized by an application to view the asset lifecycle factors associated with each network device 140 utilized by the application.

For instance, a user may search for each network device 140 associated with a login application provided by the enterprise. The login application may utilize one or more webservers, application servers, and databases. Change request list 525 may display each network device 140 and a number of data points describing network devices 140. For example, for an application server processing a login request, data points may include the status of the application server (e.g., emerging, deployed, end of life), the number of months that the application server has been in use, the importance of the applications handled by the application server, the number of errors associated with the application server, and the risk score associated with the application server. Based on the risk score associated with each network device 140, a total asset risk score may be displayed by daily risk score 524. Diagram 510 may chart the total asset risk score for the login application showing changes to the asset risk score as network devices 140 age, are updated/replaced, and process additional applications. This may allow a network administrator to view the trends associated with certain applications and implement hardware changes to reduce the risk of an operational error.

As another example, portal 500 may display risk rating information related to one or more services provided by an enterprise. For example, a financial institution may provide a website for its customers to access, check their account status, and pay bills. The enterprise may have a number of applications that facilitate these services. A user may access portal 500 using GUI 122, and identify the risk rating for each service based on each of the combined risk factors described in FIG. 1.

Modifications, additions, or omissions may be made to portal 500 without departing from the scope of the disclosure. For example, portal 500 may display data in any suitable manner including bar graphs, pie graphs, gauges, and tables.

Certain embodiments of the invention may provide one or more technical advantages. One advantage of the present disclosure provides a technical solution to the technical issues faced with implementing changes to a system network by simulating and monitoring updates to system components affected by network changes. Another advantage allows an enterprise to understand the effects a change will have on the operational capacity of network components thereby preventing future failures in the network. One or more other technical advantages may be readily apparent to one skilled in the art from the figures, descriptions, and claims, included herein.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. A system for managing operational risk in a network, comprising:
    an interface configured to:
        receive a first change request to update a characteristic of a network application, wherein the first change request includes information regarding the network application to be updated and the network application utilizes a network device;
    a hardware processor communicatively coupled to the interface, the processor configured to:
        calculate a change risk score indicating a risk level of updating the network application in response to the first change request, wherein the change risk score comprises:
            a service tier risk score, the service tier risk score calculated at least based on a determination of whether a service affected by the first change request is one of an external service and an internal service, wherein an external service receives a higher risk score than an internal service;
            a time risk score, the time risk score calculated based on a determination of whether a transaction volume at a time of day the first change request is to be implemented;
            a day risk score, the day risk score calculated based on a determination of whether a transaction volume at a day of the week the first change request is to be implemented;
            a security risk score, the security risk score calculated based on a determination of whether the network application is associated with confidential information; and
            a mobile device risk score, the mobile device risk score calculated based on a determination of whether the network application is utilized by a mobile user device;
        identify a second change request for the network device, wherein the second change request includes information regarding a characteristic of the network device to be updated;
        determine the implementation time for the first change request and the implementation time for the second change request overlap;
        increase the change risk score in response to determining the implementation time for the first change request and the implementation time for the second change request overlap;
        determine whether the change risk score is within a high-risk level; and
        in response to determining that the change risk score is within the high-risk level, implement a change counter measure;
    wherein:
        the interface is further configured to:
            communicate an activity feed to a plurality of users associated with the first change request, wherein the activity feed comprises the first change request and the change risk score;
            receive one or more comments from the plurality of users regarding the first change request; and
        the processor is further configured to adjust the change risk score based on the one or more comments.

2. The system of claim 1, wherein the processor is further configured to:
adjust the change risk score based on a technology risk score, the technology risk score comprising:
a capacity risk factor, the capacity risk factor determined by measuring a volume of real-time data flow through the network device compared to an operational limit for the network device;
an asset lifecycle factor, the asset lifecycle factor determined by comparing a current operating age of the network device to an expected lifetime of the network device; and
a resiliency risk factor, the resiliency risk factor determined based on a failover capability of the network device during an operational failure.

3. The system of claim 1, wherein the network device is monitored by a network administrator and the processor is further configured to:
adjust the change risk score based on a network administrator risk score, the network administrator risk score comprising:
an experience risk score, the experience risk score determined based on an experience level of the network administrator monitoring the network device; and
a skillset risk score, the skillset risk score determined based on one or more skillsets held by the network administrator.

4. The system of claim 1, wherein the change counter measure is one from the group consisting of: upgrading the network device and assigning a plurality of users to monitor an implementation of the first change request.

5. The system of claim 1, wherein the interface is further configured to communicate a revised change request to update the network application to a user associated with the first change request, and the revised change request comprises a new day of the week for the first change request to be implemented.

6. The system of claim 1, wherein the change risk score is determined to be a selected one from the group consisting of: a low-risk level, a medium-risk level, and a high-risk level.

7. A method for managing operational risk in a network, comprising:
receiving, at an interface, a first change request to update a characteristic of a network application, wherein the first change request includes information regarding the network application to be updated and the network application utilizes a network device;
calculating, using a processor communicatively coupled to the interface, a change risk score indicating a risk level of updating the network application in response to the first change request, wherein the change risk score comprises:
a service tier risk score, the service tier risk score calculated at least based on a determination of whether a service affected by the first change request is one of an external service and an internal service, wherein an external service receives a higher risk score than an internal service;
a time risk score, the time risk score calculated based on a determination of whether a transaction volume at a time of day the first change request is to be implemented;
a day risk score, the day risk score calculated based on a determination of whether a transaction volume at a day of the week the first change request is to be implemented;
a security risk score, the security risk score calculated based on a determination of whether the network application is associated with confidential information; and
a mobile device risk score, the mobile device risk score calculated based on a determination of whether the network application is utilized by a mobile user device;
identifying, using the processor, a second change request for the network device, wherein the second change request includes information regarding a characteristic of the network device to be updated;
determining, using the processor, the implementation time for the first change request and the implementation time for the second change request overlap;
increasing, using the processor, the change risk score in response to determining the implementation time for the first change request and the second change request overlap;
determining, using the processor, whether the change risk score is within a high-risk level;
in response to determining that the change risk score is within the high-risk level, implementing a change counter measure;
communicating, using the interface, an activity feed to a plurality of users associated with the first change request, wherein the activity feed comprises the first change request and the change risk score;
receiving, using the interface, one or more comments from the plurality of users regarding the first change request; and
adjusting, using the processor, the change risk score based on the one or more comments.

8. The method of claim 7, further comprising:
adjusting, using the processor, the change risk score based on a technology risk score, the technology risk score comprising:
a capacity risk factor, the capacity risk factor determined by measuring a volume of real-time data flow through the network device compared to an upper operational limit for the network device;
an asset lifecycle factor, the asset lifecycle factor determined by comparing a current operating age of the network device to an expected lifetime of the network device; and
a resiliency risk factor, the resiliency risk factor determined based on a failover capability of the network device during an operational failure.

9. The method of claim 7, wherein a network administrator monitors the network device, and the method further comprises:
adjusting, using the processor, the change risk score based on a network administrator risk score, the network administrator risk score comprising:
an experience risk score, the experience risk score determined based on an experience level of the network administrator monitoring the network device; and
a skillset risk score, the skillset risk score determined based on one or more skillsets held by the network administrator.

10. The method of claim 7, wherein the change counter measure is one from the group consisting of upgrading the network device and assigning a plurality of users to monitor an implementation of the first change request.

11. The method of claim 7, wherein the change risk score is determined to be a selected one from the group consisting of: a low-risk level, a medium-risk level, and a high-risk level.

12. The method of claim 7, wherein implementing a change counter measure comprises communicating a revised change request to update the network application to a user associated with the first change request, and the revised change request comprises a new day of the week for the first change request to be implemented.

13. A non-transitory computer readable medium comprising logic, the logic operable, when executed by a processor to:
receive a first change request to update a characteristic of a network application, wherein the first change request includes information regarding the network application to be updated and the network application utilizes a network device;
calculate a change risk score indicating a risk level of updating the network application in response to the first change request, wherein the change risk score comprises:
a service tier risk score, the service tier risk score calculated at least based on a determination of whether a service affected by the first change request is one of an external service and an internal service, wherein an external service receives a higher risk score than an internal service;
a time risk score, the time risk score calculated based on a determination of whether a transaction volume at a time of day the first change request is to be implemented;
a day risk score, the day risk score calculated based on a determination of whether a transaction volume at a day of the week the first change request is to be implemented;
a security risk score, the security risk score calculated based on a determination of whether the network application is associated with confidential information; and
a mobile device risk score, the mobile device risk score calculated based on a determination of whether the network application is utilized by a mobile user device;
identify a second change request for the network device, wherein the second change request includes information regarding a characteristic of the network device to be updated;
determine the implementation time for the first change request and the implementation time for the second change request overlap;
increase the change risk score in response to determining the implementation time for the first change request and the implementation time for the second change request overlap;
determine whether the change risk score is within a high risk level; and
in response to determining that the change risk score is within the high-risk level, implement a change counter measure;
communicate an activity feed to a plurality of users associated with the first change request, wherein the activity feed comprises the first change request and the change risk score;
receive one or more comments from the plurality of users regarding the first change request; and
adjust the change risk score based on the one or more comments.

14. The non-transitory computer readable medium of claim 13, further comprising:
adjust the change risk score based on a technology risk score, the technology risk score comprising:
a capacity risk factor, the capacity risk factor determined by measuring a volume of real-time data flow through the network device compared to an upper operational limit for the network device;
an asset lifecycle factor, the asset lifecycle factor determined by comparing a current operating age of the network device to an expected lifetime of the network device; and
a resiliency risk factor, the resiliency risk factor determined based on a failover capability of the network device during an operational failure.

15. The non-transitory computer readable medium of claim 13, wherein the network device is monitored by a network administrator, and the non-transitory computer readable medium further comprises:
adjust the change risk score based on a network administrator risk score, the network administrator risk score comprising:
an experience risk score, the experience risk score determined based on an experience level of the network administrator monitoring the network device; and
a skillset risk score, the skillset risk score determined based on one or more skillsets held by the network administrator.

16. The non-transitory computer readable medium of claim 13, wherein the change counter measure is one from the group consisting of upgrading the network device and assigning a plurality of users to monitor an implementation of the first change request.

17. The non-transitory computer readable medium of claim 13, wherein the change risk score is determined to be a selected one from the group consisting of: a low-risk level, a medium-risk level, and a high-risk level.

* * * * *